United States Patent
Pauwels et al.

(10) Patent No.: US 6,437,336 B1
(45) Date of Patent: Aug. 20, 2002

(54) SCINTILLATOR CRYSTALS AND THEIR APPLICATIONS AND MANUFACTURING PROCESS

(75) Inventors: Damien Pauwels, Evry; Bruno Viana, Montgeron; Andree Kahn-Harari, Paris, all of (FR); Pieter Dorenbos, GM Rijswijk; Carel Wilhelm Eduard Van Eijk, LS Delft, both of (NL)

(73) Assignee: Crismatec (FR)

( * ) Notice: Subject to any disclaimer, the term of this patent is extended or adjusted under 35 U.S.C. 154(b) by 0 days.

(21) Appl. No.: 09/686,972

(22) Filed: Oct. 12, 2000

Related U.S. Application Data

(60) Provisional application No. 60/225,400, filed on Aug. 15, 2000.

(51) Int. Cl.[7] .............................. G01J 1/58; C09K 11/79
(52) U.S. Cl. ............................... 250/361 R; 250/483.1; 252/301.4 F
(58) Field of Search .......................... 250/361 R, 483.1; 252/301.4 F

(56) References Cited

U.S. PATENT DOCUMENTS

| | | | |
|---|---|---|---|
| 4,421,671 A | 12/1983 | Cusano et al. | 252/301.4 |
| 4,473,513 A | 9/1984 | Cusano et al. | 264/1.2 |
| 4,525,628 A | 6/1985 | DiBianca et al. | 250/367 |
| 4,783,596 A | 11/1988 | Riedner et al. | 250/483.1 |
| 4,958,080 A | 9/1990 | Melcher | 250/483.1 |
| 5,660,627 A | 8/1997 | Manente et al. | 117/13 |
| 6,093,347 A | 7/2000 | Lynch et al. | 252/301.4 |

OTHER PUBLICATIONS

Lempicki, A. et al., "Ce–doped scintillators: LSO and LuAP," *Nuclear Instruments and Methods in Physics Research* A416, pp. 333–344, 1998.

Saoudi, A. et al., "IEEE Transactions on Nuclear Science," 46:6, pp. 1925–1928, 1999.

*Primary Examiner*—Georgia Epps
*Assistant Examiner*—Richard Hanig
(74) *Attorney, Agent, or Firm*—Pennie & Edmonds LLP

(57) ABSTRACT

A monoclinic single crystal with a lutetium pyrosilicate structure is described. The crystal is formed by crystallization from a congruent molten composition of $LU_{2(1-x)}M_{2x}Si_2O_7$ where LU is lutetium or a lutetium-based alloy which also includes one or more of scandium, ytterbium, indium, lanthanum, and gadolinium; where M is cerium or cerium partially substituted with one or more of the elements of the lanthanide family excluding lutetium; and where x is defined by the limiting level of LU substitution with M in a monoclinic crystal of the lutetium pyrosilicate structure. The LU alloy should contain greater than about 75 weight percent lutetium. The crystals exhibit excellent and reproducible scintillation response to gamma radiation.

33 Claims, No Drawings

SCINTILLATOR CRYSTALS AND THEIR APPLICATIONS AND MANUFACTURING PROCESS

This application claims priority from provisional application No. 60/225,400, filed Aug. 15, 2000.

FIELD OF THE INVENTION

The present invention relates to scintillator crystals, to a manufacturing process allowing them to be obtained and to the use of the said crystals, especially in gamma-ray and/or X-ray detectors.

BACKGROUND OF THE INVENTION

A scintillator crystal is a crystal which is transparent in the scintillation wavelength range which responds to incident radiation by emitting a light pulse. Scintillator crystals are widely used in detectors for gamma-ray, X-rays, cosmic rays and particles whose energy is of the order of 1 keV and greater. From such crystals it is possible to manufacture detectors in which the light emitted by the crystal that the detector comprises is coupled to a light-detection means and produces an electrical signal proportional to the number of light pulses received and to their intensity. In scintillation devices the detector is generally a single scintillator crystal.

Solid state scintillator crystals are in common use as components of radiation detectors in X-ray detection apparatus such as counters, image intensifiers and computerized tomography (CT) scanners. Such detectors are used especially in the fields of nuclear medicine, physics, chemistry and oil well logging. One embodiment of the present generation of scintillators comprises oxide mixtures in which a rare earth oxide is present as an activator, along with various combined matrix elements which are also usually rare earth oxides. Other combined metals may also be present as additives for specific purposes. These scintillators have been characterized by the advantageous properties of high efficiency, moderate decay time, low afterglow and little or no radiation damage upon exposure to high X-ray doses.

A family of known scintillator crystals widely used is of the thallium-doped sodium iodide, or NaI:Tl, type. Crystals of the NaI:Tl family have a low density and therefore a low detection efficiency for certain types of high-energy radiation; they also have hygroscopic problems.

Another family of scintillator crystals is of the barium fluoride ($BaF_2$)type. Crystals of the $BaF_2$ family are not very dense and their rapid emission component lies within the ultraviolet range, which means the use of expensive photodetectors in scintillation devices.

Another family of scintillator crystals which has undergone considerable development is of the bismuth germanate (BGO) type. Crystals of the BGO family have a long scintillation decay time which limits the use of such crystals to low counting rates.

A more recent family of scintillator crystals was developed in the 1980s and is of the cerium-activated gadolinium orthosilicate (GSO) type. Crystals of the GSO family have a low optical yield and a strong tendency to cleave, which makes them extremely difficult to prepare.

A new family of crystals was developed at the end of the 1980s in order to obtain scintillator crystals having a high light yield, short luminescence decay times and a high detection efficiency: these crystals are of the cerium-activated lutetium oxyorthosilicate (LSO) type and formed the subject-matter of U.S. Pat. No. 4,958,080. A method of growing such a crystal formed the subject-matter of U.S. Pat. No. 5,660,627. Although the scintillation properties of the crystals of this family are excellent, they do have a major drawback with regard to reproducibility, which has a negative impact on the development of their use. This is because the results of scintillation properties between two crystals of the same composition may vary very considerably as indicated, for example, by the following publications: "Ce-doped scintillators: LSO and LuAP" (A. Lempicki and J. Glodo, Nuclear Instruments and Methods in Physics Research A416 (1998), 333–344) and "Scintillation Light Emission Studies of LSO Scintillators" (A. Saoudi et al., IEEE Transactions on Nuclear Science, Vol. 46, No. 6, December 1999). These authors indicated in particular the difficulties of using LSO owing to very large variations in the scintillation properties of LSO single crystals from one crystal to another, even when they are cut from the same ingot.

Another drawback with LSO relates to its high melting point, about 2200° C. and this means that the process allowing such a crystal to be obtained requires high temperatures.

The latest scintillator compositions employ at least one of the oxides of lutetium, yttrium and gadolinium as matrix materials. These are described in detail, for example, in U.S. Pat. Nos. 4,421,671, 4,473,513, 4,525,628, 4,783,596, and 6,093,347. These crystals typically comprise a major proportion of yttria (i.e., $Y_2O_3$), up to about 50 mole percent gadolinia ($Gd_2O_3$) and a minor activating proportion of a rare earth activator oxide. Suitable activator oxides, as described in the aforementioned patents, include the oxides of europium, neodymium, ytterbium, dysprosium, terbium and praseodymium. Europium-activated scintillators are often used in commercial X-ray detectors by reason of their high luminescent efficiency, and low afterglow level. Decay times of such scintillators are on the order of 0.9–1.0 millisecond.

The search thus continues for scintillator compositions having improved properties.

SUMMARY OF THE INVENTION

The object of the present invention is to alleviate these drawbacks and to propose a novel family of scintillator crystals whose scintillation properties are of the same order of magnitude as those of LSO crystals, wherein the property variations from one crystal to another of the same composition are very much less than the property variations from one LSO crystal to another of the same composition.

One crystal according to the invention is a monoclinic single crystal obtained by crystallization of a congruent molten composition of general formula:

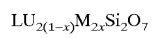

where LU is selected from lutetium, or a lutetium-based alloy which also includes one or more of the elements Sc, Y, In, La, Gd; where M is cerium, or cerium partially substituted with one or more of the elements of the lanthanide family (excluding lutetium); and where x is a variable defined by the limiting level of Lu substitution with M in a monoclinic crystal of the lutetium pyrosilicate (LPS) structure.

DETAILED DESCRIPTION OF THE INVENTION

One crystal according to the invention is a monoclinic single crystal obtained by crystallization of a congruent molten composition of general formula:

$$LU_{2(1-x)}M_{2x}Si_2O_7$$

where LU is selected from lutetium, or a lutetium-based alloy which also includes one or more of the elements Sc, Y, In, La, Gd; where M is cerium, or cerium partially substituted with one or more of the elements of the lanthanide family (excluding lutetium); and where x is a variable defined by the limiting level of Lu substitution with M in a monoclinic crystal of the lutetium pyrosilicate (LPS) structure.

The invention allows of producing scintillator crystals of high quality based on lutetium alloys. Lutetium is a very expensive metal. It is possible by utilizing alloys to retain the host lattice structure for dopants that lutetium pyrosilicate offers, while considerably reducing the cost of the raw materials needed to produce the scintillator crystal. This solution is also advantageous as it makes it possible to lower the melting point of the crystal. The elements mentioned for making up the said alloy are optically inert. Typically, if a lutetium-based alloy is used, the quantity of Sc, Y, In, La, and Gd is less than about 25% by weight of the lutetium-based alloy.

It is also possible to obtain monoclinic single crystals according to the invention in which lutetium is mixed with one or more elements from Sc, Y, In, La, Gd, in order to form an alloy in which the LPS structure is retained and in which it is possible to insert cerium or cerium partially substituted with one or more of the elements from the lanthanide family other than lutetium (elements of atomic number ranging between 57 (in the case of lanthanum) and 70 (in the case of ytterbium)).

According to another variant, the crystal is of general formula:

$$LU_{2(1-x)}M_{2x}Si_2O_7$$

where x is defined by the limiting level of Lu substitution with M in a monoclinic crystal of the lutetium pyrosilicate (LPS) structure.

According to another variant, the crystal is of general formula:

$$LU_{2(1-x)}Ce_{2x}Si_2O_7$$

where x is defined by the limiting level of Lu substitution with Ce in a monoclinic crystal of the lutetium pyrosilicate (LPS) structure.

Advantageously, the level of x substitution is less than 0.5 at %, preferably less than 0.2 at % and more preferably less than 0.1 at %. In certain embodiments, the level of x substitution is greater than 0.0001 (or 0.01%) and in other embodiments the level of x is greater than 0.0005 (or 0.05%).

According to an advantageous variant, the single crystal according to the invention has at least two dimensions each greater than 3 mm, preferably greater than 5 mm, and even more preferably greater than 10 mm. The crystals of this size are advantageously obtained by growth from a congruent melt pool using the Czochralski method. The Czochralski method is known by those skilled in the art for growing single crystals.

An important embodiment of the invention is compositions wherein the single crystals produced from the same chemical composition have a relative variation in light yield under identical excitation of less than 50%. In a preferred embodiment of the invention, at least 80 percent of crystals with the same composition, prepared in the same method using the same reactants, will vary in photons/MeV response to a gamma source such as $^{241}Am$ by less than 20%.

Without being theory, it may be considered that the excellent scintillation results and the good reproducibility which are observed in LPS single crystals may be due to the presence of insertion sites of a single type in the lutetium pyrosilicate structure, whereas the heterogeneity problems in the LSO crystals are especially due to the possible presence of several insertion sites for the cerium in the LSO structure.

An important embodiment of the invention is compositions which melt at a temperature of less than 2200° C., preferably less than 2100° C., even more preferably less than 2000° C., for example around 1900° C.

In another embodiment of the invention the decay time for the crystal is less than about 70 nanoseconds, preferably less than about 50 nanoseconds, more preferably less than about 30 nanoseconds, even more preferably less than about 15 nanoseconds. Scan times of scintillation devices are often related to primary decay time of the scintillator roughly by a factor of 1,000. Thus, a scintillator having a decay time of 1 millisecond will typically produce a scan time of about 1 second. The scanning units containing the present generation of scintillators have scan times on the order of 1 second. Shorter scan times are desired. Shorter scan times may be achievable if the primary decay time of the scanner is shortened. In general, scan time in seconds is associated with a primary decay time of an equal number of milliseconds.

The invention also relates to a process for manufacturing scintillator single crystals having a light yield under gamma excitation of greater than about 10,000 photons per MeV, in which the single crystals produced from the same chemical composition have a relative variation in light yield under identical excitation of less than 50%, comprising at least the following steps:

Supplying raw material powders, for example lutetium oxide ($Lu_2O_3$) powder, silica ($SiO_2$) powder, and powder of at least one caesium carrier, for example an oxide ($Ce_2O_3$), advantageously at predetermined stoichiometric quantities;

Optionally pre-reacting the powders supplied;

Melting of the powders and/or optionally pre-reacted powders at a temperature of less than 2200° C., preferably less than 2100° C., and even more preferably less than 2000° C., in order to obtain a molten composition of general formula $$LU_{2(1-x)}M_{2x}Si_2O_7$$

where LU is lutetium or a lutetium-based alloy which also includes one or more of the following elements: Sc, Y, In, La, Gd; where M is cerium or cerium partially substituted with one or more of the elements of the lanthanide family (excluding lutetium); and where x is defined by the limiting level of Lu substitution with M in a monoclinic crystal of the lutetium pyrosilicate (LPS) structure;

Growing of a crystal by a floating zone technique or according to the Czochralski method; and Cooling of the single crystal.

This process is particularly advantageous since the temperatures needed to melt and then grow the LPS crystals are markedly lower, about 200° C. lower, than those needed for growing LSO crystals. Thus, a process is obtained which is less expensive than that needed for the manufacture of LSO single crystals. This point is particularly important since the techniques for growing this type of crystal generally require crucibles made of iridium, the melting point of which is 2410° C., into which the raw materials for the melt pool are introduced and heated. It is known that iridium starts to soften around 2100° C., thereby shortening the lifetime of the crucibles used at this temperature. By virtue of the melting point of LPS of about 1900° C., it is possible to considerably reduce the investment and running costs of the crucibles, especially by reducing the thickness of the walls of the crucibles and/or by benefiting from a longer lifetime compared with that of crucibles made to operate at a temperature of around 2100° C. or higher. Further advantages arise owing to the melting point of LPS, about 1900° C., such as, in particular, energy savings and longer lifetimes of the refractories used in the furnaces, compared with the conditions required by a crystal melting at around 2100° C.

The crystal may be annealed in a vacuum of at least about 30 millimeters of mercury pressure, or an atmosphere of an inert gas such as argon, or in an atmosphere of an inert gas such as argon with a reducing gas such as molecular hydrogen. While annealing benefits from extended time, the annealing process can be as short as about 30 minutes.

The invention also relates to a radiation detector, especially for gamma-rays and/or X-rays, containing: a scintillator consisting of a transparent monoclinic single crystal of general formula:

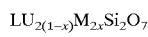
$$LU_{2(1-x)}M_{2x}Si_2O_7$$

where LU is lutetium or a lutetium-based alloy which also includes one or more of the following elements: Sc, Y, In, La, Gd; where M is cerium or cerium partially substituted with one or more of the elements of the lanthanide family (excluding lutetium); and where x is defined by the limiting level of LU substitution with M in a monoclinic crystal of the lutetium pyrosilicate (LPS) structure; a photodetector optically coupled to the scintillator in order to produce an electrical signal in response to the emission of a light pulse produced by the scintillator. The photodetector of the detector may especially any type known in the art, for example a photomultiplier, or a photodiode, or else a CCD sensor.

The preferred use of this type of detector relates to the measurement of gamma-rays or X-rays; such a system is also capable of detecting alpha and beta particles as well as electrons.

According to an advantageous variant, the detector comprises a scintillator of general formula

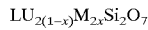
$$LU_{2(1-x)}M_{2x}Si_2O_7$$

where x is defined by the limiting level of Lu substitution with M in a monoclinic crystal of the lutetium pyrosilicate (LPS) structure. According to another advantageous variant, the detector comprises a scintillator of general formula

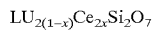
$$LU_{2(1-x)}Ce_{2x}Si_2O_7$$

where x is defined by the limiting level of Lu substitution with Ce in a monoclinic crystal of the lutetium pyrosilicate (LPS) structure.

According to an advantageous variant, the scintillator single crystal has a level of x substitution of less than 0.5 at %, especially less than 0.2 at %, and even less than 0.1 at %. The level of x substitution is advantageously greater than 0.01 at % in some embodiments, and more advantageously greater than about 0.05 at % in some embodiments.

The invention also relates to the use of the above detector in machines used in nuclear medicine, especially positron emission tomography scanners. According to another variant, the invention relates to the use of the above detector in detection machines for oil drilling.

Further details and characteristics will emerge from the description below of non-limiting preferred embodiments and from data obtained on specimens consisting of single crystals according to the invention.

EXAMPLES

Examples 1–4

Base oxides comprising lutetium oxide powder, silica powder, and $Ce_2O_3$ were combined at predetermined stoichiometric quantities and were prereacted in the solid state in platinum crucibles in an argon atmosphere, at 1500° C. The temperature was then increased. Crystals were obtained by the floating zone technique in which the single crystals were produced from polycrystalline materials obtained from base oxides. The growth rate was 2 mm/hour and the growth temperature was less than 1900° C. Tests were carried out under various production conditions and the results given in Table 1 demonstrate that the insertion of cerium is possible in an LPS-type crystal, $Lu_2Si_2O_7$.

The initial $Ce^{3+}$ concentration corresponds to the amount of cerium introduced into the melt pool and the final Ce relative percentage corresponds to the percentage of the amount of cerium inserted into the final crystal.

The single crystals obtained were transparent and were characterized by X-ray diffraction analysis. Their structure was that of thorveitite and no parasite phase was detected. The crystal lattice parameters are as follows: a=6.765 angstroms; b=8.839 angstroms; c=4.715 angstroms; B=101.96°; and V=275.9 angstroms³. It is appreciated by one of ordinary skill in the art that occasional local small variations may be observed in lattice parameters.

TABLE 1

| Example | Initial $Ce^{3+}$ conc. in reactants (at %) | Preparation conditions | $Ce^{3+}$ in Crystal divided by $Ce^{3+}$ in Example 4 |
|---|---|---|---|
| 1 | 1% | air | 54% |
| 2 | 1% | argon | 91% |
| 3 | 0.5% | vacuum | 54% |
| 4 | 0.5% | vacuum and annealing under $Ar/H_2$ for 12 hours | 100% |

These values are very close to the known values for the lattice parameters of $Lu_2Si_2O_7$ and suggest that the presence of $CE^{3+}$ has only a very slight effect on the lattice parameters.

The density of the single crystals obtained was 6.23 grams per cubic centimeter.

The light yield of the cerium-doped LPS crystals is given in Table 2 for several gamma sources.

TABLE 2

| | Light yield in photons/MeV for the following sources: | |
|---|---|---|
| Examples | $^{241}$Am | $^{137}$Cs |
| 2 | 22,020 | |
| 3 | 16,750 | 20,720 |
| 3a | 18,750 | 21,300 |
| 4 | 19,320 | 13,200 |

Example 3a corresponds to a specimen produced under the same conditions as Example 3. Excellent reproducibility in the optical properties is observed and the two crystals differ in light yield by about 10%.

The Ce-doped LPS crystals, denoted Ce:LPS, have a short scintillation decay time, for example about 30 ns.

Example 5

Reactants were premixed and reacted in a manner similar to that described for Examples 1–4. Large single crystals, that is, cylinders 80 mm in length and 25 mm in diameter, were obtained by the Czochralski growth method. These examples had the same crystallographic characteristics as examples obtained by the floating zone technique. They had no parasitic phase.

Example 6

Example 6, containing Ce and Tb, were also obtained by floating zone technique under similar conditions as described for Example 5. These specimens were obtained from a melt pool comprising 0.5 at % $CE^{3+}$ and 0.5 at % $Tb^{3+}$. The structure of the LPS was retained. The LPS crystals codoped with Ce and Tb have a lower light yield than that of the Ce-doped LPS crystals but have the advantageous characteristic of a shorter scintillation decay time, especially about 10 ns. It is believed that the scintillation properties show that effective energy transfer between Ce and Tb occurred.

Example 7

Single crystals in which lutetium mixed, or alloyed, with indium, In, were obtained under conditions similar to those used for Example 5. The indium content should be less than 25%, for example less than 20%, of the sum of Lu and In in the melt pool in order to obtain congruent melting. The lattice parameters of the crystal with a Lu:IN ratio of 9:1, that is, a $(Lu_{0.9}In_{0.1})_{2(1-x)}Ce_{2x}Si_2O_7$ crystal are: a=6.767 angstroms; b=8.834; c=4.715 angstroms; B=102.01°, and V=275.7 angstroms$^3$.

These parameters, which are slightly smaller than those for $Lu_{2(1-x)}Ce_{2x}Si_2O_7$, prove the insertion of In into the lattice. The crystal $(Lu_{0.9}In_{0.1})_{2(1-x)}Ce_{2x}Si_2O_7$ has a scintillation decay time of about 60 ns.

Example 8

Table 3 shows the physical and properties of the scintillator crystals Tl:NaI, BaF2, BGO, Ce-LSO and Ce-LPS families.

The data in Table 3 clearly shows that the LPS constitutes a novel family of scintillator crystals whose emission properties are of the same order of magnitude as those of LSO. Furthermore, the LPS crystals have the additional advantage of not having a slow scintillation decay component.

TABLE 3

| Composition: | Prior art Tl:NaI | Prior art BaF2 | Prior art BGO | Prior art Ce:LSO | Ex. 8 Ce:LPS |
|---|---|---|---|---|---|
| Effective atomic number | 51 | 53 | 74 | 66 | 64 |
| Scintillation decay time, ns | 230 | 0.8 | 300 | 40 | 30 |
| Photon yield under gamma excitation | 38,000 | 1400 | 8000 | 25,000 | >17,000 |
| Emission peak (wavelength, nm) | 415 | 220 | 480 | 420 | 380 |
| Hygroscopic | YES | NO | NO | NO | NO |

While the foregoing description represent the preferred embodiments of the present invention, it will be understood that various additions and/or substitutions may be made therein without departing from the spirit and scope of the present invention. One skilled in the art will appreciate that the invention may be used with many modifications of structure, forms, arrangement, proportions, materials, and components and otherwise, used in the practice of the invention and which are particularly adapted to specific environments and operative requirements, without departing from the principles of the present invention. The presently disclosed embodiments are therefore to be considered in all respects as illustrative and not restrictive.

We claim:
1. A monoclinic single crystal with a lutetium pyrosilicate structure of the formula

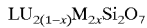

where LU is lutetium or a lutetium-based alloy of one or more of scandium, ytterbium, indium, lanthanum, and gadolinium; where M is cerium or cerium partially substituted with one or more of the elements of the lanthanide family excluding lutetium; and where x is defined by the limiting level of LU substitution with M in a monoclinic crystal of the lutetium pyrosilicate structure.

2. The crystal of claim 1 wherein LU is lutetium.
3. The crystal of claim 1 wherein M is cerium, and wherein x is defined by the limiting level of LU substitution with cerium in a monoclinic crystal of the lutetium pyrosilicate structure.
4. The crystal of claim 1 wherein x is between about 0.01 at % and about 0.5 at %.
5. The crystal of claim 1 wherein x is less than about 0.2 at %.
6. The crystal of claim 1 wherein x is less than about 0.1 at %.
7. The crystal of claim 1 wherein x is greater than about 0.05 at %.
8. The crystal of claim 1 wherein two dimensions of the crystal are each greater than about 5 mm.
9. The crystal of claim 1 wherein two dimensions of the crystal are each greater than about 10 mm.
10. The crystal of claim 1 wherein the crystal lattice parameter a is between about 6.76 and about 6.77 angstroms, b is between about 8.83 and about 8.84 angstroms, c is between about 4.71 and about 4.72 angstroms, and B is between about 101.9° and 102.1°.
11. The crystal of claim 1 wherein the crystal has a light yield under gamma excitation of greater than about 10,000 photons per MeV, wherein the crystal was obtained by crystallization of a congruent molten composition, and wherein the light yield is within 50% of the light yield of other crystals crystallized in the same manner from congruent melts with the same composition.
12. The crystal of claim 11 wherein the light yield that is within about 20% of the light yield of other crystals crystallized in the same manner from congruent melts with the same composition.
13. The crystal of claim 1 wherein LU is a lutetium-based alloy comprising lutetium and one or more of scandium, ytterbium, indium, lanthanum, and gadolinium, and wherein the lutetium-based alloy contains at least about 75 weight percent of lutetium.
14. The crystal of claim 1 wherein the crystal when excited by gamma radiation emits photons, and wherein the emission of photons decays in less than about 70 nanoseconds.
15. The crystal of claim 1 wherein the crystal when excited by gamma radiation emits photons, and wherein the emission of photons decays in less than about 50 nanoseconds.
16. The crystal of claim 1 wherein the crystal when excited by gamma radiation emits photons, and wherein the emission of photons decays in less than about 30 nanoseconds.
17. The crystal of claim 1 wherein the crystal when excited by gamma radiation emits photons, and wherein the emission of photons decays in less than about 15 nanoseconds.

18. The crystal of claim 1 wherein M comprises cerium and terbium.

19. A process for manufacturing scintillator crystals comprising:

supplying a lutetium-containing reactant, a silica-containing reactant, and a cerium-containing reactant;

melting the reactants at a temperature below about 2200° C. to form a congruent molten composition; and crystallizing a crystal from the congruent molten composition, wherein the crystal has the composition $LU_{2(1-x)}M_{2x}Si_2O_7$ in a lutetium pyrosilicate structure, where LU is lutetium or a lutetium-based alloy which also includes one or more of scandium, ytterbium, indium, lanthanum, and gadolinium; where M is cerium or cerium partially substituted with one or more of the elements of the lanthanide family excluding lutetium; and wherein x is defined by the limiting level of LU substitution with M in a monoclinic crystal of the lutetium pyrosilicate structure.

20. The process of claim 19 wherein the lutetium-containing reactant is lutetium oxide powder, the silica-containing reactant is silica powder, and the cerium-containing reactant is cerium oxide, and wherein the reactants melt at a temperature below about 2100° C. to form a congruent molten composition.

21. The process of claim 19 wherein the reactants melt at a temperature below about 2000° C. to form a congruent molten composition.

22. The process of claim 19 wherein the reactants melt at a temperature below about 1900° C. to form a congruent molten composition.

23. The process of claim 19 further comprising pretreating the supplied reactants by heating the reactants to a temperature of at least about 1500° C. under an atmosphere comprising a vacuum of at least about 30 millimeters of mercury pressure, or an atmosphere comprising argon.

24. The process of claim 19 further comprising annealing the composition under an atmosphere comprising molecular hydrogen for a period of at least about 30 minutes.

25. The process of claim 19 wherein the crystallizing the crystal from the congruent molten composition is completed by the floating zone technique.

26. The process of claim 19 wherein the crystallizing the crystal from the congruent molten composition is completed by the Czochralski method.

27. The process of claim 19 wherein the single crystals produced from the same congruent molten compositions have a relative variation in light yield under excitation from a gamma ray of less than 50%.

28. A monoclinic scintillator crystal of the lutetium pyrosilicate structure obtained by the process of claim 19.

29. A radiation detector for detecting gamma-rays and/or X-rays, comprising:

a scintillator consisting of a transparent monoclinic single crystal of the composition $LU_{2(1-x)}M_{2x}Si_2O_7$, where LU is lutetium or a lutetium-based alloy which also includes one or more of scandium, ytterbium, indium, lanthanum, and gadolinium; where M is cerium or cerium partially substituted with one or more of the elements of the lanthanide family excluding lutetium; and wherein x is defined by the limiting level of LU substitution with M in a monoclinic crystal of the lutetium pyrosilicate structure; and photodetector optically coupled to the scintillator in order to produce an electrical signal in response to the emission of a light pulse produced by the scintillator.

30. The radiation detector of claim 29 wherein LU is lutetium.

31. The radiation detector of claim 30 wherein M is cerium, and wherein x is less than 0.5 at %.

32. The detector of claim 29 operably connected to a nuclear medicine machine.

33. The detector of claim 29 operably connected to a well logging tool.

\* \* \* \* \*